US010605592B2

(12) United States Patent
Hoegele et al.

(10) Patent No.: US 10,605,592 B2
(45) Date of Patent: Mar. 31, 2020

(54) METHOD AND ARRANGEMENT FOR CAPTURING COORDINATES OF AN OBJECT SURFACE BY TRIANGULATION

(71) Applicant: Carl Zeiss Industrielle Messtechnik GmbH, Oberkochen (DE)

(72) Inventors: Wolfgang Hoegele, Rosenheim (DE); Sebastian Oberndorfner, Rosenheim (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 0 days.

(21) Appl. No.: 16/377,207

(22) Filed: Apr. 6, 2019

(65) Prior Publication Data

US 2019/0310079 A1 Oct. 10, 2019

(30) Foreign Application Priority Data

Apr. 6, 2018 (DE) ........................ 10 2018 205 191

(51) Int. Cl.
*G01B 11/02* (2006.01)
*G01B 11/25* (2006.01)
(Continued)

(52) U.S. Cl.
CPC ........ *G01B 11/2513* (2013.01); *G01B 11/002* (2013.01); *G01C 11/30* (2013.01)

(58) Field of Classification Search
CPC ............ G02B 27/0172; G02B 27/0179; G02B 2027/0138; G02B 2027/014;
(Continued)

(56) References Cited

U.S. PATENT DOCUMENTS 7,570,370 B2    8/2009   Steinbichler et al.
8,094,322 B2    1/2012   Mayer et al.
(Continued)

FOREIGN PATENT DOCUMENTS

DE    102006048234 A1    4/2008
DE    102008015499 A1    10/2009
(Continued)

OTHER PUBLICATIONS

Nayar et al., "Fast Separation of Direct and Global Components of a Scene using High Frequency Illumination" ACM Transactions on Graphics 25(3):935-944—Jul. 2006 (2006).
(Continued)

*Primary Examiner* — Michael P Stafira
(74) *Attorney, Agent, or Firm* — Falk Ewers; Ewers IP Law PLLC

(57) ABSTRACT

The disclosure relates to an arrangement and a method for capturing coordinates of an object surface by triangulation. At least two partial light patterns are generated representing a decomposition of a corresponding basic light pattern. The partial light patterns are separately projected onto the object surface, an image of the object surface is captured during the projection of one of the partial light patterns, and components of the total intensity of the captured images are ascertained. A balance of direct and indirect intensity components is established per image and for each pixel under the assumption that the indirect intensity components in all images are equal. A reflection image is established based on the direct and/or indirect intensity components which approximates the image that would be capturable during a projection of the basic light pattern without indirect intensity components. Based on the reflection image, coordinates of the object surface are ascertained.

10 Claims, 5 Drawing Sheets

(51) Int. Cl.
*G01C 11/30* (2006.01)
*G01B 11/00* (2006.01)

(58) Field of Classification Search
CPC ........ G02B 2027/0185; G02B 27/0093; G02B 21/0032; G02B 26/0833; G02B 26/103; G02B 6/262; G02B 2027/0178; G02B 21/06; G02B 21/367; G02B 26/0825; G02B 27/58; G02B 2027/018; G02B 21/0004; G02B 21/0012; G02B 21/16; G02B 21/361; G02B 21/365; G02B 23/10; G02B 23/105; G02B 26/023; G02B 27/01; G02B 27/017; G02B 27/142; G02B 27/28; G02B 27/288; G02B 27/425; G02B 5/0278; G02B 5/3025; G02B 5/32; G02B 6/0016; G02B 6/0038; G01B 11/25; G01B 11/2513; G01B 11/2518; G01B 11/2545; G01B 11/2531; G01B 11/2536; G01B 2210/50; G01B 11/002; G01B 11/005; G01B 11/24; G01B 11/2416; G01B 11/2522; G01B 11/2527; G01B 11/254; G01B 11/272; G01B 11/306; G01B 9/02083; G01B 9/0209; G01J 1/44; G01J 2001/446; G01J 1/4228; G01J 2001/4406; G01J 2001/448; G01N 2021/1787; G01N 21/39; G01N 21/4795; G01N 2021/556; G01N 21/21; G01N 21/4788; G01N 21/57; G01N 21/8806; G01N 21/9501; G01N 21/956; G01N 21/95623
See application file for complete search history.

(56) References Cited

U.S. PATENT DOCUMENTS

| | | |
|---|---|---|
| 8,811,767 B2 | 8/2014 | Veeraraghavan et al. |
| 2003/0067537 A1* | 4/2003 | Myers ................ G01B 11/2509 348/47 |
| 2004/0105580 A1* | 6/2004 | Hager ..................... G06K 9/32 382/154 |
| 2005/0068544 A1* | 3/2005 | Doemens ............. A61B 5/0064 356/601 |
| 2007/0206204 A1* | 9/2007 | Jia ..................... G01B 11/2527 356/604 |
| 2014/0118539 A1 | 5/2014 | Ota et al. |
| 2015/0204663 A1 | 7/2015 | Znamenskiy et al. |
| 2016/0078610 A1* | 3/2016 | Rudd .................... G06T 7/0004 348/87 |
| 2017/0241767 A1 | 8/2017 | Miyata |
| 2017/0365065 A1 | 12/2017 | Stigwall et al. |

FOREIGN PATENT DOCUMENTS

| | | |
|---|---|---|
| DE | 102008036710 A1 | 2/2010 |
| DE | 102012206472 A1 | 10/2013 |
| DE | 102013114687 A1 | 6/2015 |
| DE | 102017001366 A1 | 8/2017 |

OTHER PUBLICATIONS

Gupta et al., "A practical Approach to 3D Scanning in the Presence of Interreflections, Subsurface Scattering and Defocus" International Journal of Computer Vision 102 (1-3)—Mar. 2013 (2013).

* cited by examiner

METHOD AND ARRANGEMENT FOR CAPTURING COORDINATES OF AN OBJECT SURFACE BY TRIANGULATION

CROSS REFERENCE TO RELATED APPLICATIONS

This application claims priority to German patent application DE 10 2018 205 191.7, filed Apr. 6, 2018, the entire content of which is incorporated herein by reference.

TECHNICAL FIELD

The disclosure relates to a method and to an arrangement for capturing coordinates of an object surface by triangulation. The disclosure in particular relates to coordinate capturing of this type by pattern projection. The disclosure can generally be used to determine the three-dimensional shape of the object surface and/or properties of the object from the captured coordinates.

BACKGROUND

It is known to capture coordinates of object surfaces by triangulation. In particular, solutions are known in which light patterns are projected onto the object surface and an image of the object surface and thus of the light pattern, which has been changed by the object surface, is captured by a capturing device (for example by a camera). In other words, the light pattern is captured which is reflected back by the object surface and in the case of a non-planar object surface is at least locally changed (for example distorted and/or deformed) with respect to its original state. Light in the context of the present disclosure is understood to mean not only electromagnetic radiation in the visible range, but also electromagnetic radiation in other wavelength ranges. By way of example, the light pattern can be a stripe pattern.

As part of triangulation (or, in other words, using what is known as intersection), complete three-dimensional (3D) coordinates of the object surface can be determined from positions of measurement points in a depth dimension (transversely to the profile) of the object surface and in the knowledge of the measurement setup (for example the position of a pattern projection unit and/or capturing device). A coordinate or coordinate value consequently typically includes a X-, a Y-, and a Z-component in a Cartesian coordinate system having the coordinate axes X, Y, and Z. The measurement principle discussed is also explained, for example, in DE 10 2013 114 687 A1.

The totality of the coordinate measurement values (or measurement data) obtained in this way can be present in the form of what are known as 3D point clouds and describe, for example, an external shape (i.e., a surface) of at least one selected region of the object. In particular, the measurement data can be used to determine the dimensions and geometric sizes (such as the diameter or the width), to compare results with specifications and to assess them, to calculate properties of the object (for example quality parameters), and/or to produce a three-dimensional graphic representation of the object.

As described, the coordinate measurement values produced are based on light of the projected patterns, which has been reflected back by the object surface. In this context, it is furthermore known that the back-reflected radiation contains both direct intensity components and indirect intensity components, which are also contained as corresponding intensity components in an image captured by the capturing device. The direct intensity components are due to single reflections of the transmitted radiation (or of the light contained in the projected light pattern) at the object surface. This in particular relates to the radiation in which the size of the angle of incidence with respect to the surface normal is equal to the size of the angle of reflection with respect to the surface normal. The indirect intensity components (also referred to as global intensity components), on the other hand, are due in particular to multiple reflections of the transmitted radiation (or of the light contained in the projected light pattern). In this case, radiation starting from the object surface is reflected at at least one further point. This at least one further point can be located, for example, in the environment or in an adjacent region of the object surface. In this case, the direction of the radiation that is incident on the capturing device furthermore typically differs significantly from the direction of the incident radiation in the case of a single reflection. Generally speaking, the indirect intensity components are due to the radiation components that are not the radiation components of the singly reflected radiation.

Since in the context of the triangulation principle rectilinear beam profiles of the reflected radiation (that is to say generally single reflections) are assumed, indirect intensity components falsify the measurement accuracy. In particular, the indirect intensity components can, in the context of the triangulation, result in the ascertainment of incorrect depth information.

In particular, the application of the triangulation is typically based on the assumption that what is known as the correspondence problem is also solved during a measurement. That means that it is assumed that the assignment or, in other words, the correspondence of a projector pixel (or of a pixel in the originally transmitted and unchanged light pattern) and of a camera pixel (or of a pixel in the image captured by the camera) is always uniquely determinable. However, in the case of multiple reflections, it is at least no longer possible to ascertain the point at which the pattern was first reflected by the surface. For this reason, incorrect conclusions relating to which projector pixel should be assigned a specific reflected radiation component may arise from the viewpoint of the camera. As a consequence, what are known as wrong correspondences may occur, which falsify the measurement result.

For this reason, approaches are known which attempt to limit the influence of any indirect intensity components on the measurement results. DE 10 2013 114 687 A1 teaches in this respect to define a projected pattern in such a way that it does not include mutually overlapping partial surfaces from the viewpoint of the capturing device. U.S. Pat. No. 8,811,767 B2 describes the projection of various patterns onto an object surface and respective determination of depth values, wherein the depth values over a plurality of captured images and projected patterns are compared to one another in pixel-wise fashion. If the depth values for corresponding pixels in the captured images do not correspond to one another, a disturbing influence due to indirect intensity components can be deduced and the determination of the depth value can be repeated for this pixel.

However, it has been shown that sufficient accuracy cannot always be attained with the approaches used to date and that these approaches generally require great measurement outlay.

SUMMARY

It is therefore an object of the present disclosure to improve the accuracy of capturing coordinates of an object surface with an acceptable measurement outlay, in particular one which is reduced over the stated prior art.

This object is achieved by a method and an arrangement as described herein. It also goes without saying that, unless otherwise specified or evident, the features mentioned in the introductory description may also be provided individually or in any desired combination in the solution that is disclosed in the present case.

The disclosure generally makes provision for projecting onto the object surface, in addition or alternatively to a (complete) basic light pattern, partial light patterns, from which the basic light pattern is able in principle to be composed. In other words, the basic light pattern is decomposable into the partial light patterns, and/or the basic light pattern can be combined or composed again from the partial light patterns.

The partial light patterns are projected in particular one after the other onto the object surface. For the partial light patterns, or more specifically in the images of the object surface which are captured during a projection of the partial light patterns, a direct and/or indirect intensity component is then determined in each case. From the intensity components ascertained in this way, a (virtual) reflection image of the basic light pattern can be created, for example in the form of an image file. The reflection image approximates the image that would be capturable during a projection of the basic light pattern without the presence of indirect intensity components.

That means that, instead of directly projecting the basic light pattern and using an image thereof that contains both direct and indirect intensity components in the further evaluation, a reflection image of the basic light pattern, which is based on or contains substantially the direct intensity components (that is to say the intensity components of the singly reflected radiation), can be created computationally or virtually. The measurement accuracy is increased hereby, because the surface coordinates are consequently determined predominantly or substantially only on the basis of singly reflected radiation or the corresponding intensity components.

In detail, a method for capturing coordinates of an object surface by way of triangulation is provided, the method including:
  producing at least two partial light patterns which represent a decomposition of a corresponding basic light pattern;
  separately projecting the partial light patterns onto the object surface, and respectively capturing an image of the object surface during the projection of one of the partial light patterns, wherein the captured images in each case include a plurality of pixels;
  ascertaining in pixel-wise fashion initially unknown components of the total intensity of the captured images, wherein a balance of unknown direct intensity components and of unknown indirect intensity components is prepared per image and for each pixel, and it is assumed that the indirect intensity components in all images that are captured during the projection of partial light patterns of the same basic light pattern are the same;
  establishing a reflection image, which includes a plurality of pixels, of the basic light pattern on the basis of the ascertained direct and/or indirect intensity components, wherein the reflection image approximates the image that would be capturable during a projection of the basic light pattern without indirect intensity components (that is to say, free from indirect intensity components, or substantially solely based on direct intensity components); and
  ascertaining coordinates of the object surface based on the reflection image.

As mentioned above, the coordinates can include a plurality of components to determine the spatial position of a measurement point on the object surface (for example an X-, Y-, and Z-component in a Cartesian coordinate system). As part of the triangulation, in particular the Z-component can be determined, whereas the X- and Y-components can be ascertained in a known manner from additionally taking the measurement setup into account. The direction of the depth dimension, however, does not have to coincide with the direction of one of the coordinate axes. The triangulation can be performed in accordance with known principles and in particular take into account points of incidence of back-reflected radiation components in a capturing plane (for example in a capturing plane of a camera).

The basic light pattern can be an individual pattern of a light pattern sequence. The basic light patterns of the light pattern sequence can, as will be explained in more detail below, define a Gray-coded sequence of light patterns within the light pattern sequence (that is to say the light pattern sequence can be Gray coded). This may include that a frequency of successive basic light patterns in each case doubles (in particular an image frequency, explained below, or spatial frequency of coding elements).

In general, the basic light pattern can include a plurality of coding elements which can define or occupy, for example, in each case surface portions of the basic light pattern. The coding elements can include, for example, fields or stripes of a specific color or brightness. According to an aspect of the disclosure, the basic light pattern is defined as a stripe pattern containing a plurality of stripes of differently great or low brightness. The basic light pattern can furthermore be binary (that is to say include only two different types of coding elements, for example a number of bright stripes and a number of dark stripes).

The basic light pattern can generally be colored or include different gray levels. In the case of a binary basic light pattern, it may include only bright and dark coding elements, in particular only black or white coding elements, which in turn can be defined as stripes. If the basic light pattern is a stripe pattern, the individual stripes can generally have the same thickness or thicknesses that deviate from one another.

The partial light patterns can in principle be defined in the same manner as the basic light pattern. More specifically, they can be defined in accordance with one of the aforementioned aspects of the disclosure which also applies to the basic light pattern. For example, the partial light patterns can likewise be defined as stripe patterns, as long as the basic light pattern is a stripe pattern. They can likewise include the same type of coding elements and/or be colored or be composed from different gray levels. In the case of a binary basic light pattern, the partial light patterns are typically likewise binary and contain, for example, coding elements in the form of bright and dark stripes.

As mentioned above, the partial light patterns represent a decomposition of a corresponding basic light pattern. One possibility of decomposition is to split the intensity components of the basic light pattern over the individual partial light patterns, that is to say the basic light pattern would be produced upon simultaneous projection of all partial light patterns. More generally, however, all that is required in respect of the decomposition is that the basic light pattern can be calculated from the partial light patterns in accordance with a specified calculation rule. Part of the calculation rule can be, for example, an addition and/or a subtraction, that is to say the image values of the partial light patterns are added and/or subtracted in accordance with the calculation rule, wherein at least one of the summands and/or subtrahends can be optionally multiplied by a factor in accordance with the calculation rule. For this reason, the calculation rule can in particular include, or be, a linear combination of the partial light patterns (in particular position-wise linear combination of all image values of the partial light patterns with the same factors for all image values). However, the calculation rule may alternatively be any other calculation rule that makes possible calculation of the basic light pattern on the basis of the partial light patterns. Generally speaking, a linear combination can include forming a sum from weighted (in accordance with the factors) summands, wherein the weights (or weighting factors) can be any real numbers, positive and negative. In particular in the case of binary basic light patterns and/or partial light patterns, the weights can assume an absolute value of only one or zero. However, binary partial light patterns can also represent a decomposition of a non-binary basic light pattern. In particular in the case of basic light patterns and/or partial light patterns which include, for example, gray levels as image values and therefore include non-binary values, the absolute values of the weights can be selected to be non-binary, and the absolute values can lie in the closed interval of real or rational numbers between zero and one, for example.

Where the present disclosure mentions the formation of a sum or a difference (or adding or subtracting), this can generally be understood to mean the formation of a linear combination with corresponding positive or negative weights (or weighting factors). It is to be understood that mixed forms can also be present, in which a linear combination includes both additions and subtractions, for example by using correspondingly positive and negative weights.

For example, a calculation rule may make provision for the circumstance that, in a linear combination (in particular in the form of an addition with positive weighting factors) of the intensities of two or more partial light patterns, at each location defined by a two-dimensional coordinate system of the patterns, no intensity value greater than a specified maximum value occurs. If in this case two or more partial light patterns at a considered location in each case have for example the maximum radiation intensity, the linear combination of the intensities at the considered location produces a radiation intensity with the specified maximum value.

Alternatively, such a decomposition into partial light patterns may be such that at least individual ones of the partial light patterns are subtracted from one another to thereby form the basic light pattern (for example using a corresponding linear combination with negative weighting factors). In this case, the partial light patterns also represent a decomposition of the basic light pattern.

The ability of a basic light pattern to be decomposed or the fact that a quantity of partial light patterns represents a decomposition of the basic light pattern, however, does not mean that, when producing the partial light patterns, the basic light pattern must be taken as the starting point. However, when producing the partial light patterns, use is typically made at least of information on which property a or the corresponding basic light pattern has. It is generally not necessary that the calculation rule used for the decomposition into the partial light patterns is the only possible one with which the corresponding decomposition succeeds.

However, according to another exemplary embodiment, there may be the requirement that the decomposition succeeds by way of only one calculation rule, with commutation of summands, subtrahends or factors producing no other calculation rule.

According to an aspect of the disclosure, decomposing the basic light pattern relates to the division of coding elements in the basic light pattern into (partial) coding elements in the partial light patterns, which can be composed again into the corresponding coding elements of the basic light pattern upon simultaneous projection onto the object surface. For example, coding elements in the form of stripes in the basic light pattern can be divided into a plurality of stripes within the partial light pattern. A dark stripe in the basic light pattern can be divided, for example, in the partial light patterns in each case into a bright and dark stripe, wherein the bright and dark stripes in the partial light patterns are arranged such that, upon simultaneous projection, they are superposed such that again the dark stripe of the basic light pattern is imaged.

The different arrangement of the aforementioned stripes in the partial light patterns or coding elements which are additionally divided with respect to the basic light pattern can be referred to as a phase shift of the partial light patterns with respect to one another. This applies in particular to a phase shift in an X or Y image axis of the partial light patterns. The partial light patterns can thereupon be projected individually (that is to say separately from one another) onto the object surface.

It should be noted that a projection of the basic light pattern is not absolutely necessary (although quite possible in accordance with the disclosure) and can consequently also be entirely dispensed with.

For each of the partial light patterns, an image is captured (for example using a capturing device in the form of a camera). The image contains the object surface with the light pattern that has been projected thereon and is generally composed of back-reflected radiation components of the light pattern (for example from radiation components reflected in the direction of the capturing device and coming from the object surface). The captured images are here composed, in a known manner from a plurality of pixels or, in other words, image points. These can be arranged in the form of a matrix, for example along an X and Y image axis, which may be orthogonal with respect one another. Each pixel within the image can thus be assigned a defined X- and Y-value along the corresponding image axes so as to define the position thereof within the image.

In the case of a plurality of captured images, the image section can be selected such that the images each contain corresponding pixels. In particular, it is possible for those pixels to correspond to one another in the images which have a position that is defined by the same X-Y value pair. Corresponding can be understood to mean that the corresponding pixels in each case image the same measurement point on the object surface.

Pixel-wise ascertaining of the intensity components can furthermore be understood to mean that, for each pixel of the captured images, a separate ascertainment is performed to determine the relevant intensity components.

The prepared balance for each pixel can define a relationship between a total intensity ascertained for this pixel (or present in said pixel) and the unknown direct and indirect intensity component of said pixel. In particular, the balance can define that the total intensity is composed from a sum of the unknown direct intensity component and the unknown indirect intensity component.

In other words, the balance can include the fact that for each pixel an equation is established according to which the total intensity of the pixels is composed from the sum of the stated intensity components. Such balances or equations can refer to a concrete image and thus to the partial light pattern associated with said image. In particular, separate balances and/or equations can be formulated in pixel-wise fashion per projected partial light pattern and image that is captured herefor. The balances prepared in this way can be combined, over a plurality of images and partial light patterns, into one balance system, or define such a balance system. In particular, equations established in this connection can be combined into one equation system, or define such an equation system.

In order to solve such a balance or equation system, different cases can be distinguished from one another. In any case, this can be made easier by the assumption that the indirect intensity components in all images (and consequently also in all image pixels) have the same magnitude. The result of this in particular can be that in any equation system the number of the unknowns is reduced.

In the case that a predetermined number of partial light patterns is projected (for example at least two) which must always be observed and projected together so that the basic light pattern can be composed again (there are no plurality of possible combinations of partial light patterns for composing the basic light pattern), a possibly established balance or equation system can be underdetermined. If for example two partial light patterns without a corresponding plurality of possible combinations are produced (which is necessary in the case of two partial light patterns), two balances are obtained for each pixel, specifically one balance per image/partial light pattern. In each case, these balances can define that the captured total intensity is composed of an unknown direct intensity component and unknown indirect intensity component. However, even with the assumption of identical indirect intensity components, this would result in two unknown direct intensity components and one unknown indirect intensity component. This corresponds to a total of four unknowns for three balances or equations.

In order to solve such underdetermined cases, provision may therefore be made for defining, by way of appropriate assumptions, additional conditions or additional information that produce(s) additional balances or equations so as to enable the solving of a corresponding balance or equation system. One possible piece of additional information can be obtained from assuming that a change in the indirect intensity components in a neighborhood of a given pixel is low or uniform (for example in a regular neighborhood of eight pixels, which directly surround a given pixel, or in a neighborhood of five pixels in the case of a peripheral pixel, or only three pixels in the case of a corner pixel). More specifically, for a given pixel, for example, the assumption can be made that the indirect intensity components thereof correspond to a sum of the intensity components in the neighborhood thereof divided by the number of the neighborhood pixels (that is to say, the indirect intensity component corresponds to an average of the neighboring indirect intensity components). Such consideration is applied typically over the entire image, such that for an image of M×N pixels (M rows, N columns), M×N additional equations can be created.

If the partial light patterns are chosen such that a specific system of balances or equations can be established (that is to say the same number of equations and of unknowns are present), ascertainment of the intensity components is possible with little outlay using conventional calculation steps.

However, if the partial light patterns are defined such that an overdetermined balance or equation system is produced (for example in the case of a plurality of possible combinations of partial light patterns, which will be explained below, for composing the basic light pattern), an approximate solution of the balance or equation system can be effected. This, too, can be accomplished by way of conventional solution approaches, for example using a non-negative least-squares approach (that is to say, used coefficients must not take negative values) or a weighted non-negative least-squares approach. The use of iterative optimization approaches is also possible. As will be explained below, non-negativity conditions can also be defined and taken into consideration for any desired equation systems (for example including underdetermined or determined equation systems), in particular in the form such that intensity components that are to be ascertained are assumed to be non-negative and in particular greater than zero.

The assumption of identical indirect intensity components in all images, which can be used to solve the balance or equation systems mentioned, can be justified in particular when at least one (but typically both) of the following conditions is met:
the partial light patterns are at a higher-frequency than the basic light pattern;
the camera system is able to image with sufficient contrast even in the case of projection of the partial light pattern with the highest frequency.

The higher frequency of the partial light pattern (or generally the frequency of an image or light pattern) can be understood to mean a frequency of individual pattern, coding or image elements along a given axis. In general terms, it can thus be a spatial frequency, wherein the frequency is typically considered along an X image axis and/or Y image axis. The frequency can be determined in a known manner by way of Fourier analysis and/or by way of the consideration of gradient images explained below.

Figuratively speaking, the frequency can describe a number of changes with respect to the coding elements within the light pattern and/or generally a change in intensity or color within the light pattern. These changes in turn can relate to one of the image axes, which have already been mentioned. A stripe pattern having a small number of wide stripes, for example, has a lower frequency than a stripe pattern having a large number of thin stripes. The ascertainment of corresponding frequencies and classification of light patterns (in particular of stripe patterns) in accordance with the frequencies is known in the available technical field and is also used, for example, in U.S. Pat. No. 8,811,767 B2, which was mentioned in the introductory part.

As part of the present disclosure, provision may furthermore be made for the determination of a frequency comparison between a partial light pattern and the basic light pattern on the basis of image gradients. To this end, a pattern, which may be present in the form of the partial light pattern or basic pattern, is converted into gradient images. More specifically, a gradient image is created along the X and the Y image axis of the pattern (one gradient image per image axis, i.e., an X gradient image and a Y gradient image). Such gradient images can generally be created in a known manner. In particular, in each pixel, an intensity change along the corresponding X or Y image axis can be calculated and considered herefor. In other words, the X and Y gradient images are composed of pixel values which in each case describe an intensity change of the pixel in the starting image (or starting pattern, that is to say in the partial light pattern or basic light pattern) along the corresponding image axis. This can be done with the application of an appropriate mathematical filter, for example what is known as a Sobel filter.

The pixel values of the X and Y gradient images created accordingly for the partial light pattern or basic light pattern can then be added in component-wise or pixel-wise fashion, wherein in each case the absolute value of the corresponding pixel values is taken into consideration. More specifically, the absolute value of a pixel in the X gradient image can be added to the absolute value of a corresponding pixel in the Y gradient image to obtain a new pixel value. The resulting image which is composed of the new pixel values which have been obtained in this way for each pixel can be referred to as the absolute gradient image.

As part of the present disclosure, a light pattern (for example a partial light pattern) can be referred to as higher-frequency with respect to a comparison pattern (for example a basic light pattern) when an added-up value of the individual pixel values in the absolute gradient image thereof is greater than the value of the added-up pixel values in the absolute gradient image of the comparison pattern.

It is thus also possible in this way to ascertain whether a partial light pattern has a higher frequency than the basic light pattern. It is possible here owing to the aforementioned consideration of absolute gradient images to reduce a required computational power as compared to the performance of complete Fourier analyses.

For the further aforementioned condition of sufficient contrast, the capturing and in particular the resolution capability of a capturing device used for the image capturing can be considered. In particular, in order to be able to apply the assumption of a constant indirect intensity component with sufficient accuracy, partial light patterns which are as high-frequency as possible but are nevertheless able to be captured with sufficient contrast, should be used.

What is known as a modulation transfer function (MTF) of the capturing device can be considered herefor. In a known manner, said function juxtaposes the contrast which is capturable by a capturing device with a spatial frequency in a captured stripe pattern. The contrast is here given as a percentage, with 100% corresponding to a maximum contrast. The spatial frequency is typically given in the unit line pairs per millimeter. For capturing a corresponding MTF curve, stripe patterns with an increasing stripe density (that is to say an increasing number of line pairs per millimeter) are captured with the capturing device, and the contrast which is in each case imaged here is determined.

In the present case, the partial light patterns are typically chosen to be high-frequency such that the attainable contrast is as close as possible to for example 50%, and is for example substantially 50%, but no less. The for example 50% (or any desired other threshold value which is defined in advance) represent a limit at which capturing accuracy is still sufficient despite a high pattern frequency.

Subsequently, a reflection image of the basic light pattern is virtually created or calculated from the intensity components captured in this way. In particular, the reflection image can be produced in the form of an image file. The reflection image can be produced by way of a suitable computational unit, which uses the ascertained intensity components to determine and/or calculate pixel values within the reflection image. In particular, the reflection image can be produced without actual capturing of the object surface by way of a capturing device (that is to say purely by way of calculation or virtually).

In detail, the reflection image can also represent the same image section as the images captured during the projection of the partial light patterns. In particular, pixels in the reflection image can in turn correspond to pixels in the captured images. For each pixel in the reflection image, it is thus possible to determine dedicated pixel values from the direct and/or indirect intensity components for which corresponding pixels in the captured images have been determined.

In particular, the pixel values are determined such that the reflection image approximates the image that would be capturable upon a projection of the basic light pattern onto the object surface if no indirect intensity components were available. To this end, the intensity components of the captured images can be evaluated and/or offset against one another in pixel-wise fashion in the manner described below. This can be accomplished in particular in a manner such that the ascertained indirect intensity components do not represent a constituent part of the reflection image. As will be shown below, however, the use of indirect intensity components for producing the reflection image, for example as part of a subtraction of the indirect intensity components from the total intensities of the captured images, is not precluded.

The thus obtained reflection image is subsequently used to ascertain coordinates of the object surface. In particular, the reflection image can be taken as the basis for a triangulation, that is to say how an actual capture image of the capturing device is treated and evaluated, on the basis of which then a triangulation for determining for example depth values of the object surface is performed.

One advantage of this solution is that the coordinate determination is effected based on an image in the form of the reflection image which is substantially or even completely free of indirect intensity components. Instead, the indirect intensity components are calculated out, as it were, in the production of the reflection image, with the result that the reflection image primarily or only contains, or approximates, the ascertained direct intensity components. The proportion of information that may falsify the measurement result in the image that is ultimately used as the basis for the coordinate determination can therefore be significantly reduced. It should be noted that no special measurement setups are required herefor, but initially only the described decomposition into partial light patterns.

A development of the method and of the arrangement makes provision for the reflection image being produced at least for individual pixels and typically for each pixel based on the ascertained direct intensity components. This can be effected again in pixel-wise fashion. In particular, the direct intensity components can be offset against one another in accordance with a predetermined calculation rule to ascertain corresponding pixel values therefrom. The calculation rule can result from the type of the selected decomposition into partial light patterns. For example, the direct intensity components can be offset against one another via a linear combination (with positive or negative weight factors) or in accordance with a different calculation rule. This development is based on the idea that the partial light patterns in combination produce the basic light pattern. Consequently, it is possible by way of the offsetting calculation of the direct intensity components captured for the partial light patterns to approximate the direct intensity component of the basic light pattern which would likely be capturable if the basic light pattern as a whole were to be projected onto the object surface and captured.

Since the intensity components are determined in pixel-wise fashion, it is possible to determine for each pixel in the reflection image a linear combination of the pixel values (in this case the direct intensity components) of the pixels of the partial light patterns which are identical in terms of their position and therefore correspond. Alternatively, these pixel values can be offset against one another in accordance with another calculation rule. It may not be necessary in this context to additionally consider the indirect intensity components.

In accordance with a further aspect of method and arrangement, the reflection image is generated at least for individual pixels and typically each pixel on the basis of a single or multiple subtraction of an ascertained indirect intensity component from the total intensities of the captured images (and for example, depending on the decomposition, a sum or difference of said total intensities). This, too, can be effected again in pixel-wise fashion. The total intensity determined from the images can here for example relate to the sum of the direct and indirect intensity components of the individual images, wherein again a pixel-wise total intensity can be determined for example from a sum of the direct and indirect intensity components which have been ascertained in pixel-wise fashion.

The subtraction is based on the idea that, due to the fact that the partial light patterns are able to be composed to form the basic light pattern, the total intensities of the captured images can be composed to form a total intensity which would be approximately capturable in the case of a projection of the basic light pattern onto the object surface. If the ascertained indirect intensity component is subtracted from this total intensity, what remains is substantially or even only an intensity that is due to the direct intensity components.

In this context, provision is made for a plurality of the indirect intensity component to be subtracted from the total intensities (or the sum of the total intensities) (that is to say a multiple subtraction is performed). The multiple can here correspond to a number of the captured images and/or a number of the images from which the total intensity has been obtained by addition or is calculated in another way.

Analogously to the above-described pixel-wise addition of the direct intensity components, the aforementioned subtraction can likewise be done in pixel-wise fashion to ascertain individual pixel values of the reflection image. To this end, it is possible again to consider pixel values for corresponding pixels in the captured images (that is to say, indirect intensity components of corresponding pixels which are subtracted from the total intensities of exactly these pixels).

The reflection image is typically generated on the basis of only one of the variants mentioned (that is to say entirely based on one of the variants). In other words, it is possible to apply either a corresponding offsetting calculation of direct intensity components or subtraction of indirect intensity components from the total intensity for each pixel in the reflection image. Consequently, the reflection image is typically generated entirely on the basis of the sum (or general offsetting calculation) of the direct intensity components or on the basis of the aforementioned subtraction of indirect intensity components from a total intensity. However, in principle provision may also be made for the combination of both approaches, such that the corresponding offsetting calculation is performed for individual pixels of the reflection image, and the aforementioned subtraction for others.

According to an aspect of the method and of the arrangement, provision is made for at least one of the following constraints to be considered for ascertaining the intensity components from the balance:

the indirect intensity component (which is constant in accordance with the above assumption and can therefore also be stated in the singular) is assumed to be greater than 0; and
the direct intensity components are assumed to be greater than 0.

This makes it possible to exclude physically incongruous solutions and thus to obtain meaningful results. The non-negativities result from physical circumstances and therefore represent actual additional information. The assumptions can here be made and considered independently of whether the equation system is underdetermined, overdetermined or determined. If the equation system per se is determined, consideration of the aforementioned constraints can result in it being only approximately solvable.

As mentioned, the partial light patterns are typically of higher frequency than the basic light pattern. This justifies the aforementioned assumption of constant indirect intensity components in the captured images. It also makes possible a decomposition without much outlay, because for example bright stripes of a stripe basic light pattern can be directly divided into a sequence of finer (that is to say less wide) bright and dark stripes in the partial light patterns.

As mentioned above, the basic light pattern can be a constituent part of a Gray-coded light pattern sequence. This type of coding is named after the physicist Frank Gray. Decomposition into partial light patterns that can in principle be composed again to form the basic light pattern ensures that the Gray code within the light pattern sequence is maintained. In other words, the decomposition according to the disclosure of the basic light pattern into partial light patterns has no negative effect on any Gray coding, because the partial light patterns in combination in turn produce the basic light pattern and herefor approximate an ultimately evaluated reflection or capture image. The partial light patterns themselves can (but do not have to) form a Gray code, that is to say have the properties of a Gray code.

Another possibility for coding light pattern sequences is what is known as a phase shift. Due to the combinability of the partial light patterns into basic light patterns, such coding can also be retained. In other words, the reflection image which is ultimately taken as the basis for the evaluation can approximate exactly that image which would have been producible with a basic light pattern from any phase-shifted light pattern sequence (but without containing any indirect intensity components). In particular, provision can be made for the light pattern sequence to be both Gray-coded and phase-shifted. The decomposition according to the disclosure, however, in the above-explained manner ensures that these codings can be retained and used as the basis of the evaluation.

According to an aspect of the method and the arrangement, the partial light patterns are phase-shifted with respect to one another. The partial light patterns can accordingly contain comparable coding elements and in particular a comparable distribution of the coding elements relative to one another (for example stripes or bars which are in each case identically distributed or spaced-apart relative to one another). The positions and/or arrangements of the coding elements in the individual partial light patterns, however, can be phase-shifted with respect to one another, for example by closed shifting of all coding elements along one of the (X or Y) image axes. In other words, the same coding elements and in particular the same distribution of coding elements can be retained in the partial light patterns, with these, however, being shifted relative to one another along at least one image axis.

Overall, this development is a low-outlay decomposition which nevertheless allows for a high measurement accuracy.

In accordance with a further exemplary embodiment of the method and of the arrangement, more than two partial light patterns are defined. This is accomplished typically such that a plurality of possible combinations of partial light patterns exists, wherein the partial light patterns of each combination make up or would make up the basic light pattern in the case of simultaneous projection onto the object surface.

For example, provision may be made for the definition of a total of four partial light patterns, wherein two combinations of in each case two of the partial light patterns exist, from which the basic light pattern can be composed. Provision can likewise be made for the production of six partial light patterns, wherein three combinations of two partial light patterns for making up the basic light pattern exist. By providing a plurality of possible combinations of partial light patterns (that is to say a redundancy of possible combinations), the number of possible balances and/or equations, on the basis of which the relevant intensity components are determinable, can be increased.

To reduce the number of necessary exposure processes and thus the necessary projection and image capturing duration, provision may be made in general and in particular as part of the present development for the partial light patterns which have been produced overall to in each case differ from one another. In other words, it may be the case that, for producing a reflection image, no plurality of identical partial light patterns are produced and projected.

Furthermore, provision may be made in this context that, for ascertaining the intensity components, at least one further partial balance is prepared, in which two of the possible combinations of partial light patterns are equated to one another. In particular, as part of the partial balance, the pixel-wise total intensities of the captured images of each partial light pattern can be considered (that is to say the sum of the direct and indirect intensity components per pixel). Since the respective combinations of the partial light patterns can be composed to form the same basic light pattern, it can be assumed that a combination (or a sum or difference) of the captured total intensities of the partial light patterns can in turn be composed to form the same basic light pattern. This justifies the equation of corresponding combinations as part of the partial balance.

More specifically, it can be assumed that the sum, difference, or general predetermined offsetting calculation of the total intensities of the partial light patterns which, in combination, make up the basic light pattern, approximates a total intensity that would be capturable in the case of a projection of the basic light pattern. Since this is true for both of the possible combinations, the aforementioned equation can be performed.

The partial balance can generally be considered to be a further balance or equation in any balance or equation system. In particular, additional information on this, which facilitates solving such a system, can be provided.

As mentioned, the basic light pattern can correspond to an individual pattern of a light pattern sequence, or form such an individual pattern. In particular, it is possible in this context for the method according to one of the preceding aspects to be performed for a plurality of basic light patterns of the light pattern sequence. Accordingly, it is possible to produce, for a plurality of or all basic light patterns of the light pattern sequence, a reflection image on the basis of the aforementioned decomposition into partial light patterns.

In order to reduce the measurement time, provision is made here for only the corresponding partial light patterns to be projected per basic light pattern, but not the basic light pattern. The performance of a measurement with the light pattern sequence can thus include solely the exposure with a sequence of corresponding partial light patterns. Provision may furthermore be made in this context for the three-dimensional coordinates of the object surface to be determined based on the respectively produced reflection images (that is to say, per basic light pattern) of all basic light patterns of the light pattern sequence.

In this context, provision can furthermore be made for the light pattern sequence to be coded by way of Gray code and/or phase shift. As mentioned, this coding can also be retained in the case of a decomposition into partial light patterns.

Generally speaking, the production of the partial light patterns or, in other words, the decomposition of the basic light pattern into partial light patterns can also be performed in accordance with a measurement situation or measurement scene that is currently to be captured. The measurement situation or measurement scene can relate to, for example, the current capturing or environment conditions (for example the light conditions or the position of the object in the measurement volume and consequently a distance from it to a measurement volume center and/or focal plane). A measurement volume can here be understood to mean a virtual spatial volume within which a coordinate capturing by way of an arrangement or by way of the method is possible with sufficient accuracy. In general terms, it is thus possible for an adaptive decomposition in dependence on the object surface region to be measured (and in particular in dependence on a distance herefrom) to be effected. Moreover, the production or the adaptive decomposition can relate to the definition of the pattern frequency of the partial light patterns. For example, the level of a partial light pattern frequency can be defined on the basis of a position in the measurement volume and in accordance with an MTF that prevails there (for example by selecting a frequency at which the MTF indicates 50% contrast). In some regions in the measurement volume, the frequency that belongs to said 50% value of the MTF can be greater than in others, which means that a higher frequency can be used there, too. Typically, a higher frequency is possible in the measurement volume center because the projector and camera lenses used for pattern projection and pattern capturing are generally optimized or set for capturing at this position (that is to say, they image more sharply in the measurement volume center because their focal plane is located there). Moving further to the rear or further to the front in the measurement volume means leaving the focal plane of the lenses, and the MTF can deteriorate and a lower-frequency decomposition can or should be used. In other words, the frequency of a partial light pattern can thus be selected in accordance with a distance of the object to be captured from the measurement volume center and/or a distance from the focal plane (for example, the further removed the object surface region to be captured is from the measurement volume center or focal plane, the lower the frequency).

Furthermore, provision may also be made of a plurality of capturing devices (e.g. cameras), which each capture individual images, on the basis of which in each case a reflection image is produced (one reflection image per camera). In this case, an individual projection of the partial light patterns, which can then be captured by each of the cameras, suffices. Since each camera, owing to a separate viewing angle onto the object surface, captures different radiation components and in particular individual indirect intensity components, the aforementioned method can subsequently be performed for each of the cameras and images captured thereby individually.

Finally, it is also possible for at least one capturing device in the form of a color camera to be used. In this case, the pixel intensities can be captured individually for individual wavelength ranges. Subsequently, the aforementioned method (that is to say the creation of a reflection image of the basic light pattern from the captured intensity components) can be performed separately for each wavelength range. With just a single exposure, it is thus possible to obtain a plurality of evaluable recordings or reflection images. These can be used in each case for coordinate determination, wherein an average can be formed, for example, from the totality of ascertained coordinates.

Further, the disclosure relates to an arrangement having:
a pattern generation device, which is configured to generate at least two partial light patterns which represent a decomposition of a corresponding basic light pattern;
a projection device, which is configured to project the partial light patterns separately from one another onto the object surface;
a capturing device, which is configured to respectively capture an image of the object surface in the case of the projection of one of the partial light patterns, wherein the captured images each include a plurality of pixels; and
an evaluation device, which is set up to perform the following:
ascertaining in pixel-wise fashion initially unknown components of the total intensity of the captured images, wherein a balance of unknown direct intensity components and of unknown indirect intensity components is prepared per image and for each pixel, and it is assumed that the indirect intensity components in all images that are captured during the projection of partial light patterns of the same basic light pattern are the same;
establishing a reflection image, which includes a plurality of pixels, of the basic light pattern on the basis of the ascertained direct and/or indirect intensity components, wherein the reflection image approximates the image that would be capturable during a projection of the basic light pattern without indirect intensity components; and
ascertaining coordinates of the object surface based on the reflection image.

The arrangement may include any development and any further feature in order to provide or perform all of the steps, operating states and functions mentioned above or below. In particular, the arrangement may be configured to implement a method according to any of the aspects mentioned above or below.

BRIEF DESCRIPTION OF THE DRAWINGS

The disclosure will now be described with reference to the drawings wherein.

DESCRIPTION OF EXEMPLARY EMBODIMENTS

Exemplary embodiments of the disclosure will be explained below on the basis of the appended figures. Features that coincide in their nature or function may in this case be provided with the same reference signs throughout the exemplary embodiments.

Figure 1:
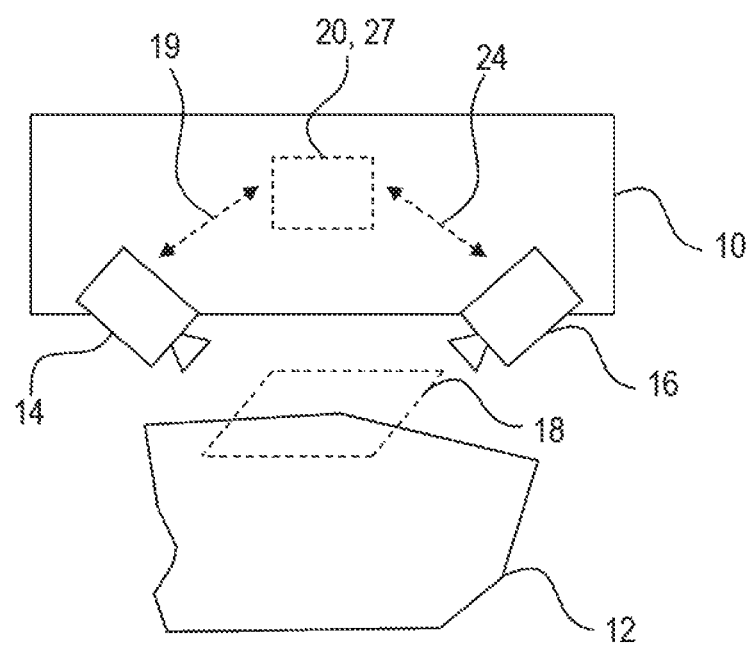
FIG. 1 shows a basic diagram of an arrangement with which a method is performed according to an exemplary embodiment of the disclosure.

FIG. 1 shows an arrangement 10 according to an exemplary embodiment of the disclosure, which, as a stand-bound arrangement (or apparatus) or as hand-held device, can be positioned relative to an object surface 12. The object surface 12 in the exemplary embodiment shown is a processed workpiece, the shape of which is to be ascertained by a three-dimensional optical measurement by the arrangement 10. The measurement data obtained can then be processed further to check size accuracy and/or surface quality.

The arrangement 10 includes a capturing device 14 in the form of a camera and a projection device 16. Both are directed at a common virtual measurement region 18, which in FIG. 1 is schematically indicated as a dashed measurement field. The measurement region 18 here defines, although this is not separately shown, a three-dimensional measurement volume in which measurement data can be obtained with optimum accuracy. In particular, the camera 14 and the projection device 16 are calibrated with respect to one another and with respect to the measurement region 18 for precisely measuring workpiece regions contained therein.

The camera 14 includes a suitable camera sensor for capturing light reflected by the object surface 12. The projection device 16 is configured to project light patterns onto the object surface 12. These light patterns in turn are capturable in the form of reflected light by the camera 14. The arrangement 10 furthermore includes an evaluation device 20 in the form of a computer or processor. The evaluation device 20 is connected to the camera 14 and also to the projection device 16 by schematically indicated signal paths 19 and 24. Data can be exchanged and/or control signals can be transmitted via the signal paths 19 and 24.

In the exemplary embodiment shown in FIG. 1, a pattern to be projected in the form of an image file is transmitted from the evaluation device 20 to the projection device 16, or vice versa. The evaluation device 20 here also provides a pattern generation device 27, which is used to decompose basic light patterns 21 explained below into partial light patterns 22. Alternatively, the pattern generation device 27 can be provided by a separate device, which includes a computational or processor unit.

Likewise, a captured camera image is transmitted from the camera 14 to the evaluation device 20. Optionally, the evaluation device 20 can also initiate projection time points and/or time durations of the projection device 16 and image capturing by the camera 14 by transmitting corresponding control signals. As part of the disclosure, the evaluation device 20 can consequently be understood not only to mean a device that performs pure evaluation. Rather, it can be understood to be a device which also outputs control signals to initiate production or capturing of the signals and/or measurement results required for the evaluation. However, this can also be performed by a separate control device (not illustrated separately) of the arrangement 10, wherein the evaluation device 20 can then merely have an evaluation or coordinate ascertainment function.

The evaluation device 20 is configured to determine coordinates of the object surface 12 by using a conventional triangulation principle. Here, a point of incidence of the radiation, which was caused by the projection of a light pattern by way of the projection device 16 and which is reflected by the object surface 12, in a capturing plane of the camera 14 is determined. Based on this, a distance of the camera 14 (and/or the arrangement 10) from the object surface 12 and thus a Z-value or depth value of a point captured on the object surface 12 can be determined.

When projecting a light pattern onto the object surface 12, the already described single and multiple reflections may occur. The latter can result in indirect illumination components or indirect intensity components in the reflected radiation that is captured by the camera 14. Said indirect intensity components can falsify the measurement result in the aforementioned manner and in particular make correct assignment of what are known as the projector pixels and camera pixels more difficult.

Figure 2:
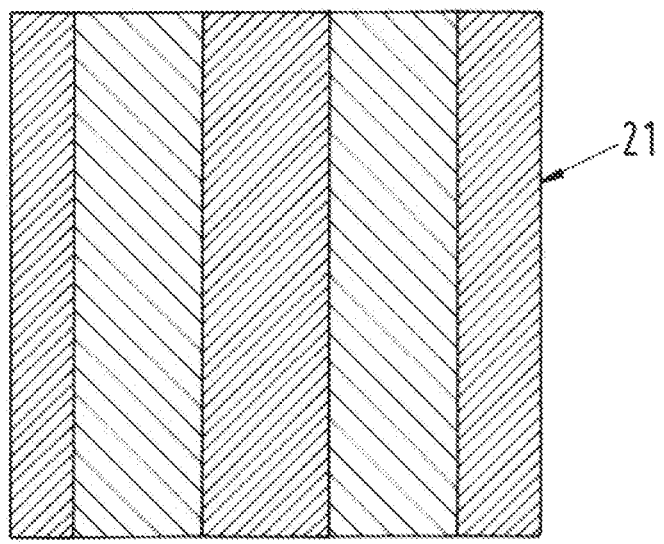
FIG. 2 shows a basic light pattern according to a first exemplary embodiment of the disclosure.

An exemplary embodiment of a projected light pattern (or a light pattern that is to be projected) in the form of a basic light pattern 21 is shown in FIG. 2. The basic light pattern 21 is an individual pattern of a light pattern sequence, which is Gray-coded. Within the light pattern sequence, a plurality of partial light patterns are projected, one behind the other, onto the object surface 12 so as to be able to perform, in a known manner, a correct assignment of projector pixels and camera pixels and, based thereon, a precise coordinate determination.

In the case of a Gray-coded light pattern sequence, the individual projected patterns differ here in a defined manner, in particular with respect to their spatial frequency. The methods, explained below using the example of the basic light pattern 21 illustrated, for producing a reflection image can here be applied to every pattern from the light pattern sequence.

The basic light pattern 21 is a binary pattern, consisting only of two coding elements. These are dark or black, surfaces, which are shown with dense hatching, and bright, or white, surfaces, which are shown with less dense hatching. In FIG. 2, the surfaces extend from the top to bottom and define stripes which are parallel with respect to one another. However, it is not necessary for the method that a binary pattern is used, nor that a stripe pattern is used. In particular, stochastic patterns, colored patterns and/or patterns which include a plurality of gray levels can also be used.

If the basic light pattern 21 were to be projected directly onto the object surface 12, the camera 14 would capture both direct and indirect intensity components, which is why it would also be possible to obtain only measurement results of correspondingly low precision. In accordance with the exemplary embodiment shown, provision is therefore made for the basic light pattern 21 to be decomposed into a plurality of partial light patterns 22, which are shown in FIGS. 3A to 3F.

Figure 3A:
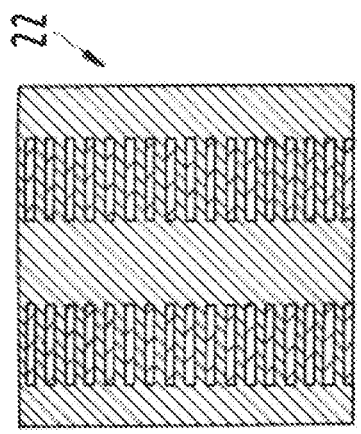
FIGS. 3A to 3F show possible decompositions of the basic light pattern shown in FIG. 2 into a plurality of partial light patterns.

Starting from the partial light pattern 22 in FIG. 3A, it is initially apparent that the division into black and white stripes in accordance with the basic light pattern 20 was retained in principle (again illustrated as surfaces of dense and less dense hatching). However, the white stripes were additionally divided, specifically transversely to their longitudinal direction. More specifically, the white stripes were divided such that they are formed from a plurality and in particular an alternating sequence of black and white bars. The individual bars here extend along a horizontal axis and each have the same width.

The further partial light patterns 22 also have bar-type divisions of the white stripes of the basic light pattern 22. However, the positions of the white and black bars are here shifted in the longitudinal direction relative to the other partial light patterns 22 (that is to say along a vertical axis in the image plane). The shift is selected such that all partial light patterns 22 differ from one another. This prevents capturing of identical partial light patterns 22, which would provide no additional measurement information, but would at most disadvantageously increase the total measurement duration.

Figure 3B:
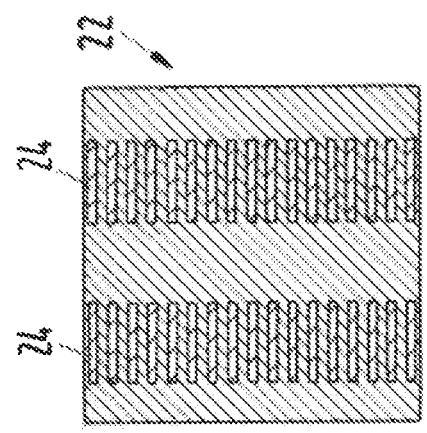

It is apparent in detail in the further partial light patterns 22 from FIG. 3B that the uppermost white bars 24 (that is to say the uppermost bars having less dense hatching) are shifted slightly with respect to the uppermost white bars 24 from FIG. 3A. This can also be described as a phase shift in the longitudinal direction, or, with respect to the coordinate system shown in FIG. 3A, as a Y phase shift of the partial light patterns 22 of the basic light pattern 21 relative to one another. Since the six partial light patterns 22 are correspondingly phase-shifted in each case with respect to one another, the decomposition performed in the example shown can also be referred to as a sixfold Y phase shift.

Figure 3C:
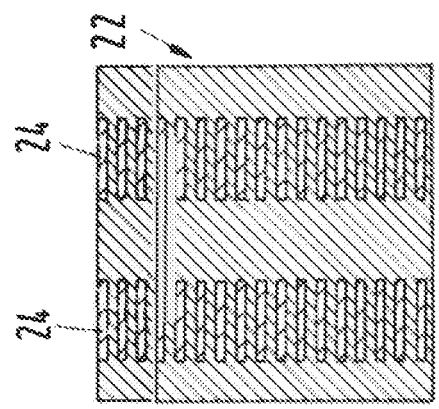
Figure 3D:
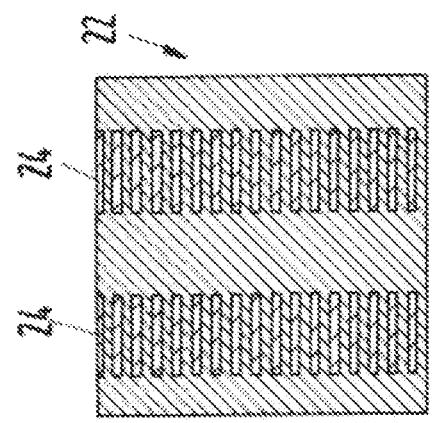
Figure 3E:
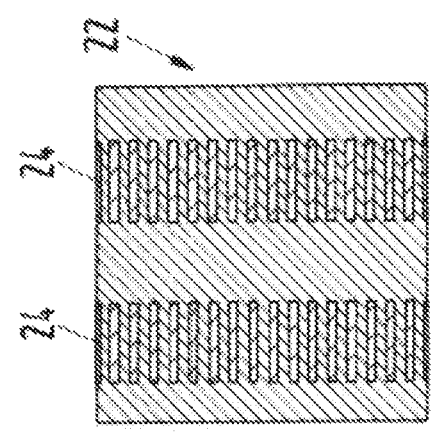
Figure 3F:
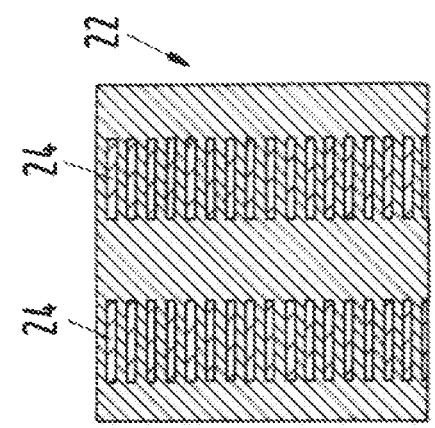

On consideration of the further FIGS. 3C to 3F, it is apparent that each of the partial light patterns 22 is further shifted downward in the longitudinal direction relative to the respectively preceding partial light pattern 22. Consequently, all partial light patterns 22 are phase-shifted with respect to one another in the longitudinal direction or along the Y-axis. If shifting is performed such that a distance from the pattern periphery that exceeds a width of the bars occurs at the upper periphery of the white stripes, then the corresponding gap is successively filled by additionally supplemented upper white bars 24 (see FIGS. 3E and 3F compared to FIG. 3D).

The partial light patterns 22 are furthermore generated such that a plurality of combinations exists from which the basic light pattern 21 can be composed again. In particular, in the case of a simultaneous projection of the correspondingly combinable partial light patterns 22 onto a planar surface (which is not necessary as part of the method, and is mentioned only for the purpose of explanation and definition), the basic light pattern 21 would again be formed.

In detail, in the exemplary embodiment shown, the basic light pattern 21 can be generated or composed again from a combination of the partial light patterns 22 from FIG. 3A and FIG. 3D, from a combination of the partial light patterns 22 from FIG. 3B and FIG. 3E, and a combination of the partial light patterns 22 from FIG. 3C and FIG. 3F. That means, there are three possible combinations of partial light patterns 22 for composing the basic light pattern 21.

A relevant property of the partial light patterns 22 is furthermore that they have a higher frequency with respect to the basic pattern 22 (that is to say, have a higher spatial frequency). This relates in particular to the number and sequence of coding elements (i.e., of bright and dark surfaces). In particular, the difference in the frequencies can be examined, however, on the basis of the consideration of gradient images which were explained above.

The frequency of the partial light patterns 22 is furthermore selected such that a resolution capability of the camera 14 just about still provides a satisfactory capturing result (that is to say the highest possible frequency of the partial light patterns 22 is selected). With respect to a modulation transfer function, or MTF curve, which was generally explained above, that means that the camera 14 can still capture the partial light patterns 22 with a minimally required contrast of for example 50%.

What should ultimately be taken into account is that the variant shown for decomposing the basic light pattern 21 into partial light patterns 22 with transversely extending bars is merely an example. Decomposition of a different type can likewise be performed, for example into partial light patterns 22 with bars that extend longitudinally. It is likewise possible to use different gray levels within the partial light patterns 22 instead of binary black and white surfaces. However, what remains true is that at least one possible combination of partial light patterns 22 for making up the basic light pattern 21 must exist.

As part of the method, after definition of the partial light patterns 22, each of the partial light patterns 22 is projected onto the object surface 12, wherein in each case an image of the object surface 12 with the projected-on partial light pattern 22 is captured by the camera 14. The captured camera image is here set up in pixel-wise fashion in a known manner and includes a plurality of matrix-type pixels or image points. The image plane of the camera image can be defined or described analogously to the illustration of FIG. 3A by an X-axis and a Y-axis. Therefore, each pixel within a captured image can be assigned a concrete X-value and a Y-value to uniquely describe the position thereof.

The text below considers balances for describing for example intensities in captured images and/or connections between the basic light pattern 21 and the partial light patterns 22. These balances can in each case be understood (and/or be defined) as linear combinations, wherein weights (or weighting factors) with absolute values of 1 are used in the considered examples. For the case of the exemplary embodiment which will be considered first below, the values of the weights are furthermore positive. Weights of absolute values that differ from one are appropriate for example in the case of a decomposition into partial light patterns based on gray levels.

If the object surface 12 with a projected-on partial light pattern 22 is captured, it is possible with respect to the captured total intensity in the camera image for each pixel to draw up the following balance (1):

$$B0i(x,y)=D0i(x,y)+S(x,y) \quad (1)$$

where:

$B0i(x, y)$ is the total intensity of a pixel captured in the image at the location $(x, y)$ at a projection of the partial pattern $0i$ (i.e., $i$ is an index for stating a currently considered partial light pattern, and typically takes integer values between 1 and n, wherein n is the number of partial light patterns);

$D0i(x, y)$ is a direct intensity component of a pixel at the location $(x, y)$; and $S(x, y)$ is an indirect intensity component of a pixel at the location $(x, y)$.

Since the partial light patterns 22 in the exemplary embodiment are of higher frequency than the basic light pattern 22 and the frequency is selected in particular such that just about the minimally sufficient contrast of for example 50% is attained in the images captured by the camera 14, it is possible to assume with a sufficient accuracy that the indirect intensity components per captured image and also per pixel are substantially constant. It is therefore possible in the text below to also refer to the indirect intensity component merely in the singular form, although a corresponding intensity component, in accordance with the balance (1), exists in each pixel and in each image.

As a result, the intensity component in the captured camera images which can change in the camera images in the case of projection of different partial light patterns 22 (i.e., which represents a dynamic intensity component) is thus considered approximately a direct intensity component. However, the intensity component which can remain constant in the camera images in the case of projection of different partial light patterns 22 (i.e., which represents a static intensity component) is considered approximately an indirect intensity component.

It is important to emphasize that, depending on the measurement setup, other criteria which justify a corresponding assumption of constant indirect intensity components can also be relevant. In particular, it may suffice if only one of said criteria with respect to the partial light pattern frequency and the contrast is met.

Since in the case shown six partial light patterns 22 (i=01 to 06) were projected, for which in each case individual camera images have been captured, it is also possible to prepare six balances based on the above general formulation of the balance (1).

Here, initially the following assignment of the partial light patterns 01 to 06 to the illustrations in FIGS. 3A to 3F applies: FIG. 3A shows a partial light pattern 22 designated as 01, FIG. 3B shows a partial light pattern 22 designated as 02, FIG. 3C shows a partial light pattern 22 designated as 03, FIG. 3D shows a partial light pattern 22 designated as 04, FIG. 3E shows a partial light pattern 22 designated as 05, and FIG. 3F shows a partial light pattern 22 designated as 06.

Corresponding balances are thus as follows, wherein the assumption of pixel-wise constant indirect intensity components in the captured images is taken into account by the indication of the pixel-wise constants $S(x, y)$. The merely pixel-wise constancy of the indirect intensity components $S(x, y)$ is the result of the fact that the corresponding intensity components, although assumed to be invariable over the individual images, still can vary within a respective image for example due to a specific intensity distribution:

$$B01(x,y)=D01(x,y)+S(x,y);$$

$$B02(x,y)=D02(x,y)+S(x,y);$$

$$B03(x,y)=D03(x,y)+S(x,y);$$

$$B04(x,y)=D04(x,y)+S(x,y);$$

$$B05(x,y)=D05(x,y)+S(x,y);$$

$$B06(x,y)=D06(x,y)+S(x,y). \quad (2)$$

The result is thus a system of balances (2) (or an equation system (2)), which in each case includes seven unknowns per pixel $(x, y)$, specifically the constant indirect intensity component $S(x, y)$ and the unknown direct intensity components D01 to D06. The total intensities B01 to B06, on the other hand, are known and can be read from the respective captured camera images.

In order to solve this system, additional constraints are taken into consideration, according to which the direct intensity components D01 to D06 and the indirect intensity component $S(x, y)$ are larger than zero (that is to say in particular cannot be negative values). This may also be formulated as follows.

$D0i(x,y)>0$ for $i=1,\ldots,6$; and $S(x,y)>0$.

Further balances (partial balances below) can be derived from the redundant possibilities for combining partial light patterns 22, from which the basic light pattern 21 can again be composed. As already mentioned above, for the total intensity G (x, y) of a reflection image, which would in principle be capturable in the case of a projection of the basic light pattern 21, the following applies:

$$G(x,y)=D01(x,y)+S(x,y)+D04(x,y)+S(x,y);$$

$$G(x,y)=D02(x,y)+S(x,y)+D05(x,y)+S(x,y);$$

$$G(x,y)=D03(x,y)+S(x,y)+D06(x,y)+S(x,y). \quad (3)$$

The combinations of the partial light patterns can be equated to one another, because they in each case result in the same total intensity G (x, y). The indirect intensity components S (x, y) here cancel each other out. The result is therefore the following additional partial balances (4) and (5):

$$D01(x,y)+D04(x,y)=D02(x,y)+D05(x,y) \quad (4);$$

$$D01(x,y)+D04(x,y)=D03(x,y)+D06(x,y) \quad (5).$$

Together with the previous balance or equation system (2), this means eight equations with seven unknowns. Consequently, an overdetermined balance or equation system can be formulated, which can be illustrated as follows in the manner of a matrix:

$$\underbrace{\begin{bmatrix} 1 & 0 & 0 & 0 & 0 & 0 & 1 \\ 0 & 1 & 0 & 0 & 0 & 0 & 1 \\ 0 & 0 & 1 & 0 & 0 & 0 & 1 \\ 0 & 0 & 0 & 1 & 0 & 0 & 1 \\ 0 & 0 & 0 & 0 & 1 & 0 & 1 \\ 0 & 0 & 0 & 0 & 0 & 1 & 1 \\ 1 & 1 & -1 & -1 & 0 & 0 & 0 \\ 1 & 1 & 0 & 0 & -1 & -1 & 0 \end{bmatrix}}_{A} \cdot \underbrace{\begin{bmatrix} D01(x,y) \\ D04(x,y) \\ D02(x,y) \\ D05(x,y) \\ D03(x,y) \\ D06(x,y) \\ S(x,y) \end{bmatrix}}_{\vec{x}} = \underbrace{\begin{bmatrix} B01(x,y) \\ B04(x,y) \\ B02(x,y) \\ B05(x,y) \\ B03(x,y) \\ B06(x,y) \\ 0 \\ 0 \end{bmatrix}}_{\vec{b}}$$

In principle, and as will be shown below for a further exemplary embodiment, it is not necessary for any such partial light pattern decomposition to be performed so that, as a result, an overdetermined system of balances can be formulated. However, it has been shown that particularly robust and accurate results are attainable thereby.

To solve this equation system, the preceding constraints are also taken into consideration, according to which the indirect intensity components and the direct intensity component are larger than zero.

Overall, an approximative solution in accordance with what is known as the non-negative least squares approach is performed:

$$\operatorname{argmin} \|A^T A \vec{x} - A^T \vec{b}\| \text{ w.r.t. } \vec{x} > 0$$

Alternatively, a weighted non-negative least squares approach with a weight matrix W can be selected:

$$\operatorname{argmin} \|A^T W A \vec{x} - A^T W \vec{b}\| \text{ w.r.t. } \vec{x} > 0$$

However, in principle other solution approaches known from literature can also be used.

In every case, it is possible in this manner to determine the direct intensity components of D01 to D06 for each pixel and also the indirect intensity component S (x, y) which is assumed to be constant. In order to produce or approximate therefrom a possible reflection image of the basic light pattern 21, which is substantially or exclusively based on the direct intensity components D01 to D06, it is possible for example to calculate the total intensity G (x, y) of a reflection image pixel in accordance with any of the balances listed under (3), but wherein the indirect intensity component S (x, y) is set to zero.

In consideration of the plurality of possible combinations listed under (3) for ascertaining the total intensity, it is also possible, however, to form the arithmetic mean from at least two but typically all combinations. This is reproduced below as the equation (6), wherein the indirect intensity component S (x, y) was again set to zero:

$$G(x,y)=\tfrac{1}{6}\times[D01(x,y)+D02(x,y)+D03(x,y)+D04(x,y)+ \\ D05(x,y)+D06(x,y)] \quad (6).$$

The result is thus an intensity value G (x, y) for each pixel in an image, referred to as a reflection image, which is available for example in purely digital form or as an image file. The reflection image is consequently ascertained and generated purely by computational means or, in other words, virtually. It is consequently not based on an actual capturing of the object surface by the camera 14. Due to its aforementioned composition from the direct intensity components D01 to D06 of the partial light patterns 22, however, it approximates the image that would have been capturable by the camera 14 in the case of a projection of the basic light pattern 21 without indirect intensity components.

In other words, the reflection image 20 is a camera image which has been ascertained by calculation and is free from disturbances with respect to any indirect intensity components, in the case of a theoretical projection of the basic light pattern 21. In particular, error potentials in the form of multiple reflections or undesirable background illumination are reduced or substantially completely avoided due to non-consideration of the indirect intensity components. The signal-to-noise ratio of the measurement data obtained is therefore correspondingly increased.

Instead of basing the further evaluation on a coordinate determination on the basis of an actually captured image in the case of a projection of the basic light pattern 21, the reflection image is used, because in it, the possible error potentials relating to any indirect intensity components have been reduced. The evaluation of the reflection image is then again performed by a triangulation principle, wherein the reflection image is treated as an image which has actually been captured by the camera 14, and is evaluated in a known manner for determining surface coordinates.

Since in the case shown the basic light pattern 21 is an individual pattern from a light pattern sequence, the aforementioned method steps are also repeated for each of the further individual patterns (or basic light patterns 21) in the light pattern sequence. In concrete terms, the light pattern sequence in the case shown consists of ten individual patterns. The individual patterns are defined in each case as stripe patterns, but overall they form a Gray-coded light pattern sequence, which is why they differ from one another in a known manner (for example in terms of in each case individual image frequencies). As already explained above, this Gray coding is maintained by the present method, because any decompositions into partial light patterns 22 are revised again in connection with the ascertainment of the reflection image and are thus not contrary to any coding.

Each individual pattern is here decomposed, analogously to the light patterns shown in FIGS. 3A to 3F, into six partial light patterns 22 by a sixfold Y phase shift. The total number of the patterns to be projected as part of the light pattern sequence is consequently sixty (six times ten). The basic light patterns 20, on the other hand do not need to be projected separately. After the corresponding projection, ten virtually ascertained or, in other words, computationally produced reflection images are obtained (one per individual pattern from the light pattern sequence). The plurality of the reflection images can then be used to solve the already mentioned correspondence problem between projector pixels, or pattern pixels, and captured image pixels in a known manner on the basis of the Gray code and also to determine the coordinates of the object surface 12.

Figure 4A:
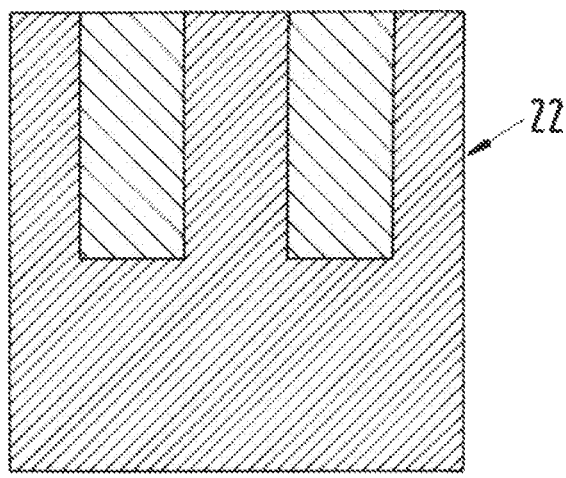
FIGS. 4A and 4B show decompositions of the basic light pattern shown in FIG. 2 according to a second exemplary embodiment of the disclosure.
Figure 4B:
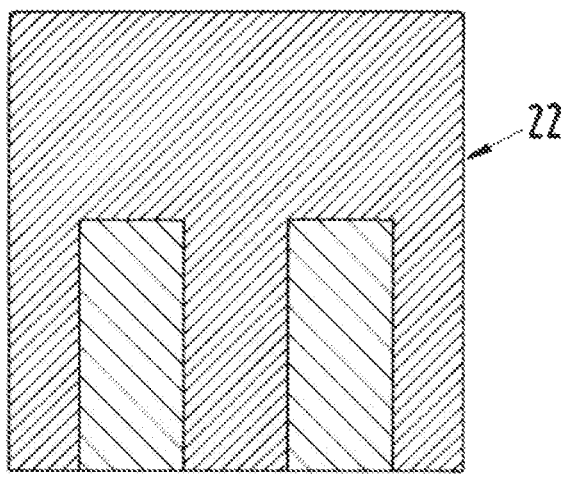

A further exemplary embodiment will now be explained, in which the basic light pattern 20 from FIG. 2 is decomposed in a different manner. In this case, a decomposition into merely two partial light patterns 22 is performed in accordance with FIGS. 4A and 4B, from which the basic light patterns 21 can be composed again. Consequently, there does not exist a possible plurality of combinations for being able to compose the basic light pattern 20 again. In this case, the white stripes of the basic light pattern 21, which are again illustrated with less dense hatching, were halved, wherein the partial light patterns 22 contain one of the halves per stripe. The partial light pattern 22 from FIG. 4A will be indexed below with 01, and the partial light pattern 22 from FIG. 4B will be indexed with 02.

Analogously to the previous system of balances (2) (or equations), the following system (7) can be defined here:

$$B01(x,y)=D01(x,y)+S(x,y);$$

$$B02(x,y)=D02(x,y)+S(x,y) \quad (7).$$

The solution (or solution set) of this underdetermined system (two equations with three unknowns S, D01 and D02) can be defined as a straight line in which the values for D1 and D2 are plotted along the Y and X axes. In this case, two balances are therefore available in accordance with the above system (7) with three unknowns (D01 (x, y), D02 (x, y), S (x, y)). More specifically, for a captured image having M×N pixels (M rows, N columns), 2×M×N balances are available, wherein actually 3×M×N balances are required.

As an additional piece of information, which makes possible the solution of the balance system, neighborhoods around individual pixels are therefore considered. In a manner known per se, a pixel has eight direct neighbors (that is to say eight further pixels which directly surround said pixel). If a considered pixel is located at the image periphery, the direct neighborhood consists of only five pixels. If a pixel is located in a corner of the image, there are only three direct neighbors. For such neighborhoods, the assumption is that the indirect intensity components do not vary significantly, but are the same on average. Consequently, the following further balance (8) can be provided, wherein $K_i$ is the number of pixels in the neighborhood of a considered pixel at $(x_i, y_i)$ and k indicates the individual pixels in the neighborhood of the considered pixel:

$$S(x_i,y_i)=1/K_i \times \Sigma S(x_k,y_k) \quad (8).$$

In the balance (8), the sum of the indirect intensity components S for all k pixels in the direct neighborhood of the considered pixel is thus formed and then divided by the corresponding neighborhood pixel number $K_i$. It is furthermore to be understood that the balance (8) for a captured image results in M×N additional equations, with the result that, overall, sufficient equations for the ascertainment of the values of the unknowns are obtained.

As part of the method, it is of course also possible to define mathematically determined balance and equation systems, for example by way of a suitable decomposition and/or definition of redundancies with respect to the combinabilities of the partial light patterns 22. Since this solution of such systems, however, is trivial, this is not illustrated in more detail.

Figure 5A:
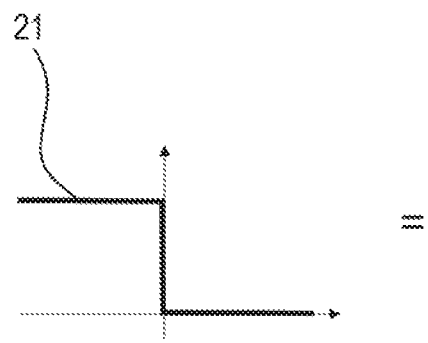
FIGS. 5A and 5B show a decomposition of a basic light pattern according to a third exemplary embodiment of the invention.
Figure 5B:
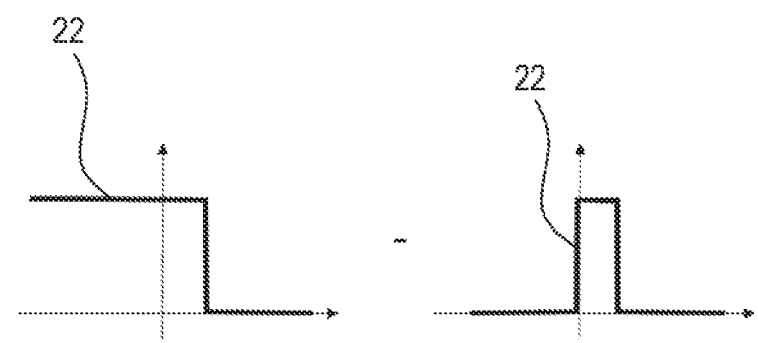

FIGS. 5A to 5B show possibilities for the decomposition of a basic light pattern 21 into partial light patterns 22 according to a third exemplary embodiment. The patterns 21, 22 are here illustrated as a brightness profile along a given image axis (for example the X-axis analogously to FIG. 3A). The horizontal axis in FIGS. 5A-5B here in each case represents a location along the corresponding image axis, wherein the origin of this axis corresponds to an image center point. The vertical axis, on the other hand, indicates a brightness value which is zero in the origin (i.e., a dark or black surface would be present there).

The basic light pattern 21 shown in FIG. 5A is accordingly again defined to be binary and has, to the left of the image center, a bright surface and, to the right, a dark surface. One possible decomposition thereof into two partial light patterns 22 is shown in FIG. 5B. It is apparent that, in this case, the partial light patterns 22 do not make up the basic light pattern 21 again in the case of a simultaneous (imaginary) projection onto an object 12. Instead, the basic light pattern 21 can in this case be reconstructed from the fact that the images or intensity distributions captured for the partial light patterns 22 are subtracted from one another (see corresponding minus sign in FIG. 5B). Accordingly, in a balance formulated analogously to the preceding case (3), the respective image intensities B0i (or the direct and indirect intensity components D0i and S forming said image intensities) for the individual partial light patterns 22 would have to be subtracted from one another rather than added in order to be able to compose therefrom the basic light pattern 21.

The subtraction of the partial light patterns 22 for producing the basic light pattern 21 can again be described by a linear combination or, in other words, be defined as such. Again, weights (or weighting factors) with absolute values of one and, depending on the decomposition, even negative weight, are used herefor. The same is true for the further balances that are to be adapted in accordance with the decomposition, such as for example the already mentioned balance (3).

It is understood that the foregoing description is that of the exemplary embodiments of the disclosure and that various changes and modifications may be made thereto without departing from the spirit and scope of the disclosure as defined in the appended claims.

What is claimed is:

1. A method for capturing coordinates of an object surface by triangulation, the method comprising:

generating at least two partial light patterns representing a decomposition of a basic light pattern;

separately projecting the at least two partial light patterns onto the object surface;

capturing images by respectively capturing one image of the object surface during the projecting of one of the at least two partial light patterns, the images including a plurality of pixels;

ascertaining, in a pixel-wise fashion, initially unknown intensity components of a total intensity of the images by establishing a balance of direct intensity components and of indirect intensity components per image and for each pixel, and the indirect intensity components in all images captured during the projecting of partial light patterns of a same basic light pattern being equal;

establishing a reflection image including a plurality of pixels of the basic light pattern based on at least one of the direct intensity components and the indirect intensity components, the reflection image approximating an image capturable during a projection of the basic light pattern without the indirect intensity components; and ascertaining coordinates of the object surface based on the reflection image.

2. The method as claimed in claim 1, further comprising: generating the reflection image at least for individual pixels based on the direct intensity components.

3. The method as claimed in claim 1, further comprising: generating the reflection image for individual pixels based on a single or multiple subtractions of the indirect intensity component from total intensities of the images.

4. The method as claimed in claim 1, wherein, for the ascertaining of the initially unknown intensity components from the balance, at least one of (a) the indirect intensity component is larger than zero, and (b) the direct intensity components are larger than zero.

5. The method as claimed in claim 1, wherein the at least two partial light patterns are of a higher frequency than the basic light pattern.

6. The method as claimed in claim 1, further comprising: generating the at least two partial light patterns in accordance with a measurement scene currently to be captured.

7. The method as claimed in claim 1, further comprising: defining more than two partial light patterns to permit a plurality of combinations of partial light patterns, wherein the partial light patterns of each of the plurality of combinations form the basic light pattern when simultaneously projected onto the object surface.

8. The method as claimed in claim 7, further comprising: establishing at least one further partial balance for ascertaining the intensity components from the balance in which two possible combinations of the partial light patterns are equated to one another.

9. The method as claimed in claim 1, further comprising: reconstructing a plurality of basic light patterns of a light pattern sequence, the basic light pattern corresponding to an individual pattern from the light pattern sequence with the plurality of basic light patterns, and ascertaining three-dimensional coordinates of the object surface based on reflection images of the plurality of basic light patterns of the light pattern sequence.

10. An arrangement for capturing coordinates of an object surface by triangulation, the arrangement comprising:

a pattern generation device configured to generate at least two partial light patterns representing a decomposition of a corresponding basic light pattern;

a projection device configured to separately project the at least two partial light patterns onto the object surface;

a capturing device configured to capture images by respectively capturing an image of the object surface during a projection of one of the at least two partial light patterns, the images including a plurality of pixels; and an evaluation device configured to:

ascertain, in pixel-wise fashion, initially unknown components of a total intensity of the images by establishing a balance of direct intensity components and of indirect intensity components per image and for each pixel, and the indirect intensity components in all images captured during the projection of partial light patterns of the same basic light pattern being equal;

establish a reflection image including a plurality of pixels of the basic light pattern based on at least one of the direct intensity components and the indirect intensity components, the reflection image approximating an image capturable during the projection of the basic light pattern without indirect intensity components; and ascertain coordinates of the object surface based on the reflection image.

* * * * *